United States Patent [19]
Seibel et al.

[11] Patent Number: 5,479,081
[45] Date of Patent: Dec. 26, 1995

[54] AC MOTOR CONTROLLER WITH VOLTAGE MARGIN ADJUSTMENT

[75] Inventors: Brian J. Seibel, Grafton; Timothy M. Rowan, Wauwatosa; Russel J. Kerkman, Milwaukee, all of Wis.

[73] Assignee: Allen-Bradley Company, Inc., Milwaukee, Wis.

[21] Appl. No.: 173,329

[22] Filed: Dec. 23, 1993

[51] Int. Cl.⁶ .................................................. H02P 5/28
[52] U.S. Cl. ........................ 318/805; 318/807; 318/432; 318/434; 318/801
[58] Field of Search ........................ 318/805, 807, 318/432, 434, 801, 798, 799

[56] References Cited

U.S. PATENT DOCUMENTS

| | | | |
|---|---|---|---|
| 3,781,616 | 12/1973 | Mokrytzki et al. | 318/432 |
| 3,838,322 | 9/1974 | Greenwell | 318/432 |
| 3,991,352 | 11/1976 | Fry et al. | 318/805 |
| 4,461,988 | 7/1984 | Plunkett | 318/802 |
| 4,649,331 | 3/1987 | Jahns | 318/798 |
| 5,029,263 | 7/1991 | Rozman | 318/798 |
| 5,032,771 | 7/1991 | Kerkman et al. | 318/798 |
| 5,121,043 | 6/1992 | Kerkman et al. | 318/805 |

Primary Examiner—William M. Shoop, Jr.
Assistant Examiner—Karen Masih
Attorney, Agent, or Firm—Mark W. Pfeiffer; John J. Horn; George A. Montanye

[57] ABSTRACT

A motor controller for control of an AC motor which monitors the DC power provided to an inverter for synthesizing AC waveforms having the needed frequency and phase to power the motor. Information about variations in the DC power to the inverter are incorporated into the control strategy by adjusting a motor base frequency at which the motor moves from a constant torque to a constant horsepower mode of control. The change of control mode allows decrease in the field current, and hence a decrease in the required quadrature voltage while preserving the torque current. The torque current is ultimately limited by a user programmable direct voltage limit.

6 Claims, 3 Drawing Sheets

AC MOTOR CONTROLLER WITH VOLTAGE MARGIN ADJUSTMENT

FIELD OF THE INVENTION

The field of the invention is controllers for electric motors and, more particularly, motor drives for alternating current (AC) motors.

BACKGROUND OF THE INVENTION

Induction Motors

Induction motors have broad application in industry, particularly when large horsepower is needed. A three phase induction motor receives three phases of electrical voltage to produce a rotating magnetic stator field. A rotor contained within the stator field experiences an induced current (hence the term induction) which generates a rotor field. The interaction of the rotor field and the stator field causes rotation of the rotor.

A common rotor design is a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field.

The use of this induced current to generate the rotor field eliminates the need for slip rings or brushes to provide power to the rotor, making the design relatively maintenance free.

Field Oriented Control of Induction Machines

To a first approximation, the torque and speed of an induction motor may be controlled by changing the frequency of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is the difference in speed between the rotor and the stator field. An increase in slip increases the rate at which flux lines are cut by the rotor, increasing the rotor generated field and thus the force or torque between the rotor and stator fields.

Referring to FIG. 1, the rotating phasor 14 of the stator magneto motive force ("mmf") will generally have some angle $\alpha$ with respect to the phasor of rotor flux 18. The torque generated by the motor will be proportional to the magnitudes of these phasors 14 and 18 but also will be a function of their angle $\alpha$. The maximum torque is produced when phasors 14 and 18 are at right angles to each other (e.g., $\alpha=90°$) whereas zero torque is produced if these phasors are aligned (e.g., $\alpha=0°$). The phasor 14 may therefore be usefully decomposed into a torque producing component 15 perpendicular to the phasor 18 and a flux component 17 parallel to rotor flux phasor 18.

These two components 17 and 15 of the stator mmf are proportional, respectively, to two stator currents $I_{qe}$, a torque producing current, and $I_{de}$, a flux producing current, which may be represented orthogonal vectors in the rotating frame of reference (synchronous frame of reference) of the stator flux having slowly varying magnitudes. The subscript "e" is used to indicate that a particular quantity is in the rotating frame of stator flux.

Accordingly, in controlling an AC motor, it is generally desired to control not only the frequency of the applied voltage (hence the speed of the rotation of the stator flux phasor 14) but also the phase of the applied voltage relative to the current flow and hence the division of the currents through the stator windings into the $I_{qe}$ and $I_{de}$ components. Control strategies that attempt to independently control the currents $I_{qe}$ and $I_{de}$ are generally termed field oriented control strategies ("FOC").

Generally, the production of any given set of currents $I_{qe}$ and $I_{de}$ require that the stator be excited with voltages $V_{qe}$ and $V_{de}$ as follows:

$$V_{qe}=R_s*I_{qe}+\omega_e*\lambda_{de} \quad (1)$$

$$V_{de}=R_s*I_{de}+\omega_e*\lambda_{qe} \quad (2)$$

Where $\lambda_{qe}$ is the q-axis stator flux linkage and $\lambda_{de}$ is the d-axis stator flux linkage. In the case of an induction motor, $\lambda_{qe}$ is a function of the d-axis stator and rotor currents and $\lambda_{de}$ is a function of the q-axis stator and rotor currents.

This implies that a supply voltage $V_{motor}$ must be at least equal to:

$$V_{motor}=\sqrt{(V_{qe}^2)+(V_{de}^2)} \quad (3)$$

In fact, a supply voltage above $V_{motor}$ is required to accommodate the voltage drops incident to any regulation circuit.

Disturbances on the Controller Supply

The generation of the required phased voltages needed to realize the voltages $V_{qe}$ and $V_{de}$ is typically done by means of pulse width modulated ("PWM") inverter. Such an inverter receives a source of DC power from a voltage bus together with signals indicating the phase and frequency of the desired power to be transmitted to the motor. The inverter synthesizes the necessary AC waveforms. Such inverters are well known in the art.

The voltage of the DC supply voltage to the inverter may vary. This is especially true in systems where one DC bus is used for multiple controllers. In this latter case, one or more controllers causing drives in the system to accelerate or decelerate under full load can rapidly change the load to the DC bus thus affecting the DC bus voltage. When the DC power is provided by a thyristor regeneration converter, such as are known in the art, the DC voltage may drop to 65% to 70% of its nominal voltage during regeneration. The DC power to the inverter may also be subject to variations in the voltage of the AC mains supplying the converter, such variations being caused by brownout conditions, phase loss, or transient overloads.

As the DC bus voltage drops, the effective gain of the inverter used to supply the AC voltage waveforms to the motor may drop. This reduced gain detrimentally affects the inverters ability to regulate its output. If the DC voltage drops sufficiently in a current regulation FOC scheme, an overcurrent trip may occur shutting off the drive altogether.

Although shutting off the drive may save the controller, in certain applications, such as assembly lines, the resultant down time can cost thousands of dollars. For this reason, many controllers use motors having substantially lower voltage ratings than the ratings of the AC mains. For example, motors may be used that are rated at 360 or 400 VAC instead of the nominal inverter peak output of 460

VAC. For given current flows, such "de-rated" motors provide less power than might otherwise be obtained.

SUMMARY OF THE INVENTION

The present invention provides a robust method of accommodating variations in DC bus power such as may be caused by the above discussed effects. The invention incorporates the bus voltage as one of the factors used in the control strategy. As the voltage on the bus drops, the motor is first forced into a constant horsepower operation. As the speed of the motor increases further, the motor is forced into a peak horsepower mode.

Specifically, a motor controller of the present invention, for AC electric motors having stator windings and a moving rotor and receiving a supply voltage from a DC source, has an inverter receiving the supply voltage. A controller/inverter controls the AC voltages in frequency and phase so as to operate the motor in constant torque as a function of rotor speed below a base frequency and to operate the motor in constant horsepower as a function of rotor speed above the base frequency. A supply voltage compensator receives the value of the supply voltage to lower the base frequency when the supply voltage drops.

The supply voltage compensator may receive a desired value of a direct voltage $V_{d(ref)}$ of the AC voltages and the value of the supply voltage to produce a quadrature voltage reference value $V_{q(ref)}$ obtainable with the given values of the supply voltage and the desired direct voltage $V_{d(ref)}$ and may incorporate a flux regulator connected to the inverter/controller for adjusting the AC waveforms to control the quadrature voltage $V_q$ to not exceed the quadrature voltage reference value $V_{q(ref)}$.

This control may be accomplished by decreasing the direct current $I_{de}$ in response to a drop in the supply voltage.

Thus, it is an object of the invention to provide a systematic approach for treating variation in the DC supply voltage to the inverter into the control strategy of an AC motor controller. As the voltage drops, the controller first sacrifices the flux component of the driving waveforms by moving the motor into a constant horsepower mode.

The motor controller may also include a direct voltage calculator producing a desired value of the direct voltage to be applied to the motor as a function of the desired rotor speed when compared to the actual rotor speed. This desired value of the direct voltage may be limited by a direct voltage limit effectively providing a torque limit insofar as the torque current is largely proportional to the direct voltage.

Thus it is another object of the invention to limit the torque of the motor as necessary to insure that adequate voltage margin exists. Limiting the direct voltage moves the motor into a peak horsepower mode where the quadrature current is decreased with increasing speed.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
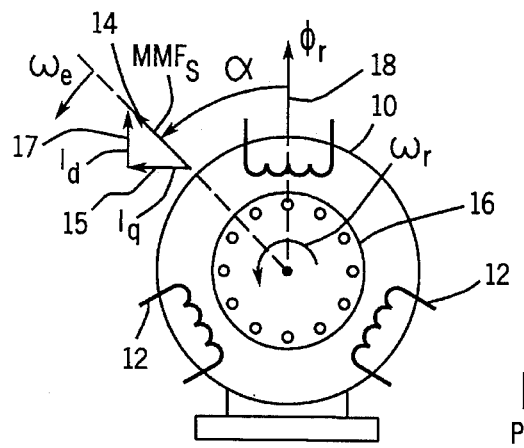
FIG. 1 is a schematic view in cross-section of an induction motor showing instantaneous locations of the rotor flux, the stator mmf and the torque and flux components of the stator mmf.

Referring to FIG. 1, an AC motor 10 includes two or more stator windings 12 that may be energized to produce a rotation mmf phasor 14 having a angular rate of rotation $\omega_e$ about a center of the motor.

In the case of an induction motor, the flux field generated by this mmf phasor 14 cuts through windings on a rotor 16 inducing a current flow in those windings to produce a rotor flux phasor 18 displaced from the stator phasor 14 by an angle α. Torque on the rotor 16 is generally proportional to the component 15 of the stator phasor 14 that is perpendicular to the rotor phasor 18. This component 15 is termed the torque component and is generated by a torque current $I_q$ being part of the total stator current through the stator windings 12. A component 17 of the stator phasor 14 parallel to the rotor phasor 18 does not produce torque directly as a result of its alignment and is termed the flux component and is proportional to a current $I_d$ having 90° in phase shift with respect to the current $I_q$ and also being a component of the total current flowing through the stator windings 12.

As described above, AC voltages arbitrarily applied to the windings 12 will result in unspecified or uncontrolled direct and quadrature currents $I_d$, $I_q$. Proper division between direct and quadrature currents, $I_d$ and $I_q$, may be obtained by carefully controlling the phase and frequency of the AC voltages with respect to the rotor speed $\omega_r$. This is performed by field oriented control.

As a preparatory matter, it should be noted that the concepts of field oriented control are largely indifferent to the actual number of AC voltages needed to generate the rotating phasor 14 of the stator mmf. Generally, three AC voltages separated in phase by 120° are provided to the stator windings 12. However as few as two AC voltages separated in phase by 90° may be used in an appropriately configured motor and greater numbers of AC waveforms and stator windings are theoretically possible. These variations and the conversions of the present example to different numbers of stator windings and AC voltages is well understood in the art and will not be described herein.

The Field Oriented Controller

Figure 3:
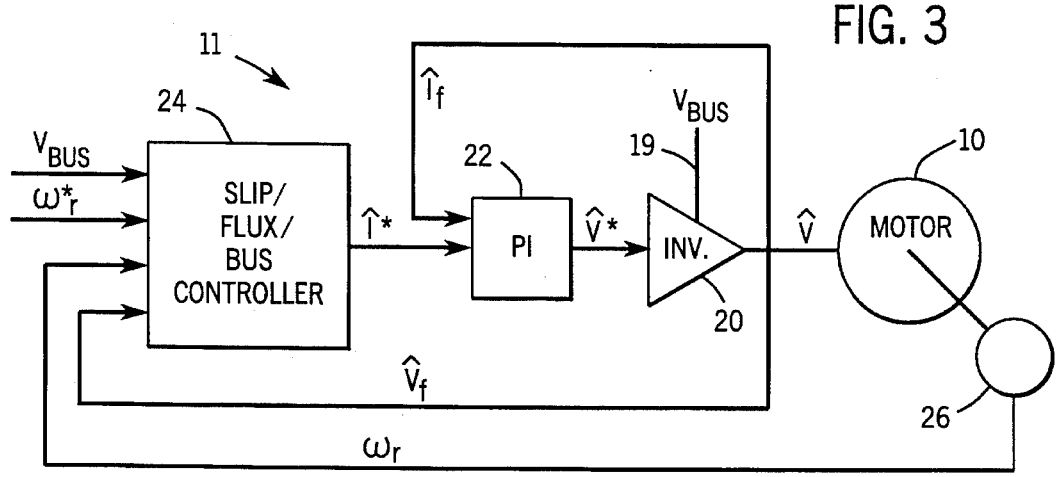
FIG. 3 is a simplified block diagram of an entire field oriented controller useful for practicing the present invention and having a slip/flux/bus controller for providing a desired current vector to a proportional/integral feedback regulator controlling an inverter which provides the voltage to the motor.

Referring to FIG. 3, a field oriented controller 11 includes an inverter 20 which may synthesize two or more AC waveforms, together indicated by the vector quantity $\hat{V}$, from a source of DC voltage $V_{bus}$ 19 and a command signal $\hat{V}^*$. Henceforth vector quantities will be indicated by a caret. The command signal $\hat{V}^*$ is provided by a proportional/integral regulator 22 operating on a current feedback vector $\hat{I}_f$ and a current command signal $\hat{I}^*$. The latter is produced by a slip/flux/bus controller 24 receiving rotor speed feedback signal $\omega_r$, a voltage feedback vector $\hat{V}_f$, a motor speed command $\omega^*_r$, and a signal indicating the voltage of $V_{bus}$ 19, i.e., $V_{bus}$. For ease of calculation, the values $\hat{I}$, $\hat{I}_f$ and $\hat{V}$ at various points in the control process, may be converted to a synchronous reference frame with respect to the stator mmf of phasor 14 (of FIG. 1) as indicated by a subscript letter of "e" This transformation to a synchronous reference frame, although mathematically involved, is well known in the art.

A. The Inverter

The inverter 20 may preferably be a pulse width modulated (PWM) inverter such as are also well known in the art. PWM inverters 20 use a network of solid state switching elements, such as gate turn off transistors (not shown), to convert the DC voltage of the $V_{bus}$ 19 into a train of pulses of varying widths that approximate the desired AC waveform. Generally, the amplitude of the AC waveform synthesized by the inverter 20 is less than the DC voltage on the $V_{bus}$ 19 as a result of voltage losses in the switching devices.

B. The Proportional/Integral Regulator

The voltage command signal $\hat{V}^*$ is provided to the inverter 20 by the proportional/integral regulator 22. The proportional/integral regulator 22 adjusts the voltage command signal $\hat{V}^*$ in phase and frequency to produce the desired current flows $I_d$ and $I_q$ for field oriented control. This adjustment is via the feedback of the proportional/integral regulator 22 operating on the difference between the actual motor current vector $\hat{I}_f$ and a current command signal $\hat{I}^*$ produced by the slip/flux/bus controller 24 to be described below. Generally, the field oriented control of motor 10 is performed by generating the appropriate current command signal $\hat{I}^*$ that may produce the necessary voltage command signal $\hat{V}^*$ to effect the desired direct and quadrature currents.

C. The Slip/Flux/Bus Controller

Figure 4:
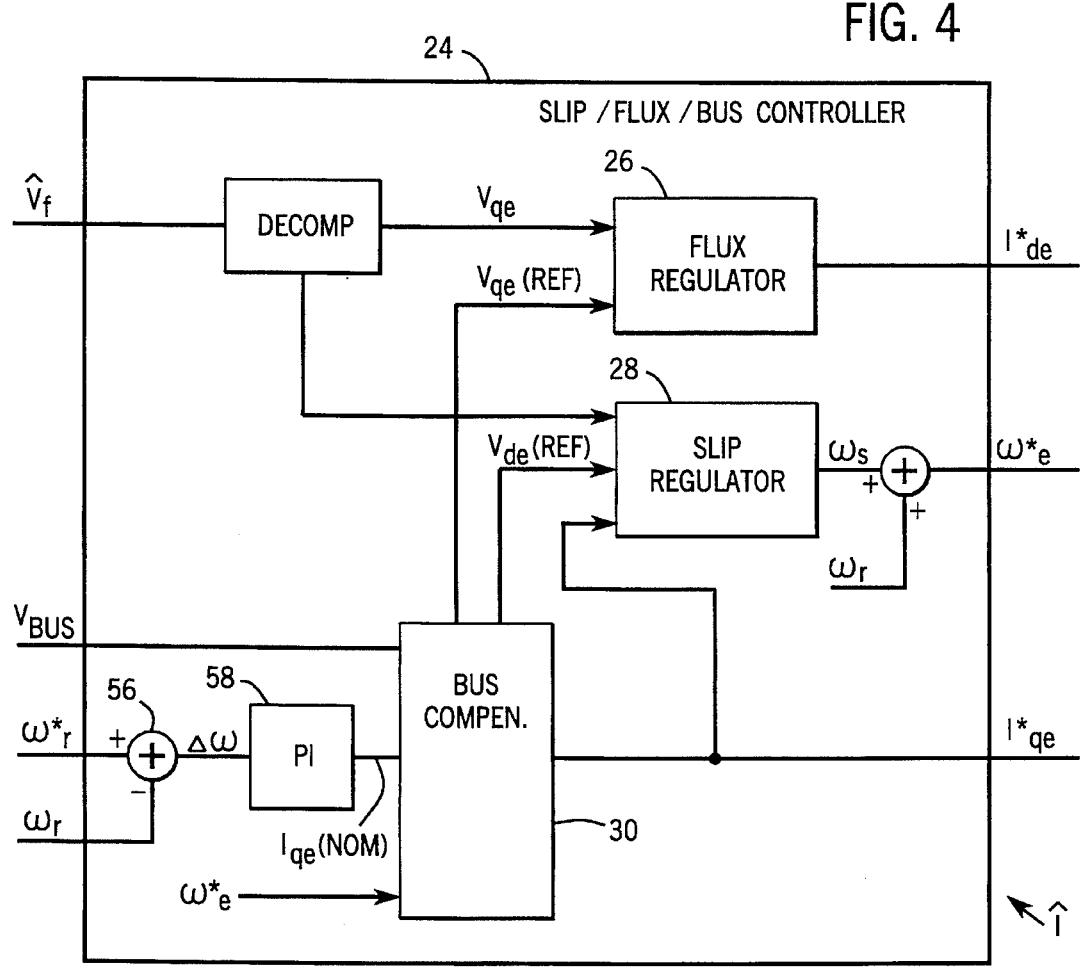
FIG. 4 is a detailed block diagram of the slip/flux/bus controller of FIG. 3 showing a bus compensation circuit connected to provide reference voltages to a flux regulator and slip regulator.

Referring still to FIG. 4, the current command signal $\hat{I}^*$ is generated by the separate control of its two quadrature components in a synchronous reference frame: the direct current command $I^*_{de}$, the torque current command $I^*_{qe}$ and by control of the stator frequency command $\omega^*_e$. These components are each calculated by the slip/flux/bus controller 24 and together uniquely define $\hat{I}^*$. The slip/flux/bus controller 24 produces these three components by three blocks: the flux regulator 26, the slip regulator 28, and the bus compensator 30.

1. The Flux Regulator

Figure 5:
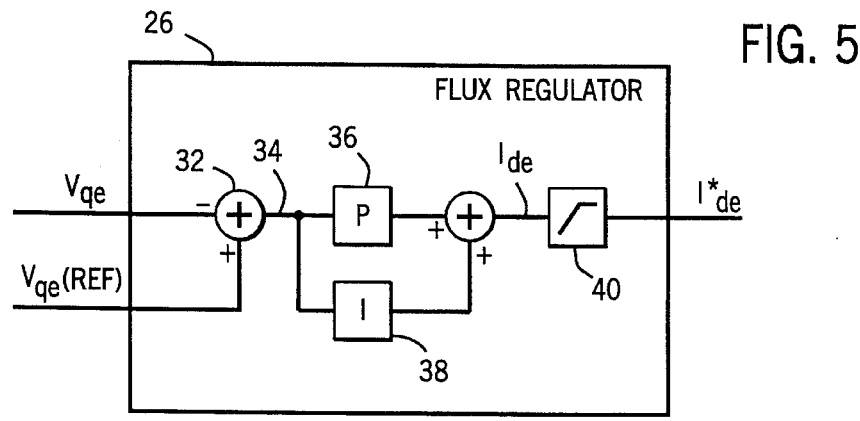
FIG. 5 is a detailed block diagram of the flux regulator of FIG. 4.

Referring momentarily to FIG. 5, the flux regulator receives an actual value of the quadrature voltage $V_{qe}$ derived from the voltage feedback $\hat{V}_f$ and compares it with a reference voltage $V_{qe}(\text{ref})$ at summing junction 32 to produce an error value 34. This error value is a received by proportional and integral gain blocks 36 and 38 whose outputs are summed to produce a desired flux current $\hat{I}^*_{de}$.

This flux current is limited by a limiter 40 to not exceed a predetermined value and becomes the value $\hat{I}^*_{de}$.

The feedback control of flux current, but without the reference to reference voltage $V_{qe(ref)}$, is generally known in the art and disclosed in U.S. Pat. No. 5,032,771 to Kerkman et al assigned to the same assignee as the present invention and hereby incorporated by reference.

Generally, the flux regulator 26 serves to decrease the flux component of the motor current as the stator frequency $\omega_e$ increases. In the present invention, this control is linked to the value of the reference voltage $V_{qe(ref)}$ such that as that reference voltage $V_{qe(ref)}$ is decreased, the flux component is decreased. The reference voltage $V_{qe(ref)}$ is determined by the bus compensator 30 as will be described below.

2. The Slip Regulator

Figure 6:
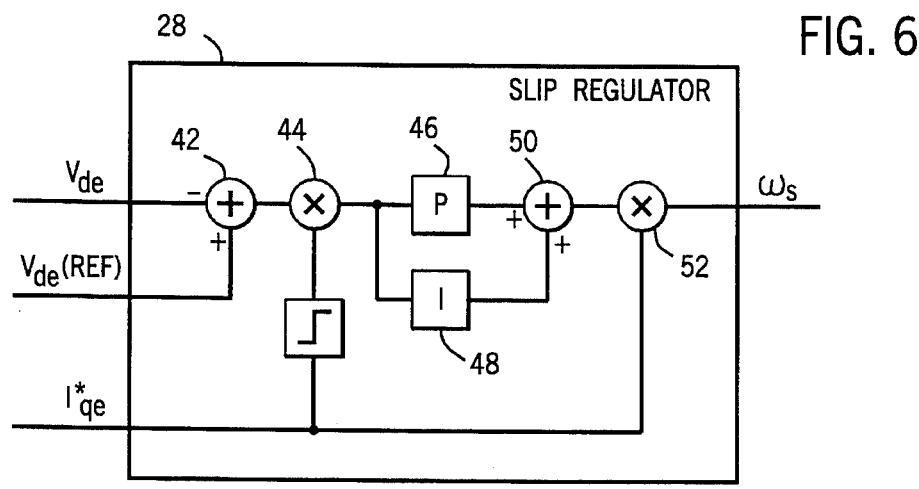
FIG. 6 is a detailed block diagram of the slip regulator of FIG. 4.

Referring now to FIG. 6, the slip regulator 28 of Fig. 4 receives a value of the direct voltage $V_{de}$ derived from the feedback voltage $\hat{V}_f$ and a reference value $V_{de(ref)}$ for the direct voltage from the bus compensator 30. The slip regulator 28 also receives a command value of the torque current command $I^*_{qe}$ from the bus compensator 30. The difference between $V_{de}$ and $V_{de(ref)}$ is taken at summing junction 42 and multiplied by the sign of the derived torque current command $I^*_{qe}$ at multiplier 44 whereupon it is received by proportional and integral blocks, 46 and 48, whose outputs are summed at summing junction 50. This sum is multiplied by $I^*_{qe}$ at multiplier 52 to produce a value of the slip $\omega_s$.

The slip $\omega_s$ controls, to a large degree, the torque on the motor because it describes the number of flux lines being cut by the rotor per unit time. Such slip control is generally described in the aforementioned U.S. Pat. No. 5,032,771 and the references cited therein and generally seeks to effect a compromise between the amount of slip and the amount of torque current.

In the present invention, when $V_{de(nom)}$ is greater than or equal to $V_{de(max)}$, thus setting $V_{de(ref)} = V_{de(max)}$, $\omega_s$ is limited and thus serves to change the control strategy to one of peak horsepower operation as will be described.

The slip $\omega_s$ from the slip regulator 28, together with the feedback value of rotor speed $\omega_r$ is also used to produce a command value of stator frequency $\omega^*_e$ according to the relationship:

$$\omega^*_e = \omega_s + \omega_r \quad (4)$$

Stator frequency $\omega^*_e$ is used by the bus compensator 30 to provide a value of $I^*_{qe}$ as will be described.

But for the addition of the reference signals in FIGS. 5 and 6 as generated by the bus compensator, the slip regulator 28 and the flux regulator 26 are similar to those previously known and used in field oriented control.

3. The Bus Compensator

The bus compensator 30 changes the control strategy of the controller 11 in a manner dependent on the variations in $V_{bus}$ 19 primarily through providing the two reference voltages $V_{qe(ref)}$ and $V_{de(ref)}$ to the flux regulator 26 and the slip regulator 28 respectively. The first reference voltage $V_{qe(ref)}$ is a reference for the quadrature voltage and the second reference voltage $V_{de(ref)}$ is a reference for the direct voltage. The bus compensation block also provides a command value for the torque current command $I^*_{qe}$.

Figure 2A:
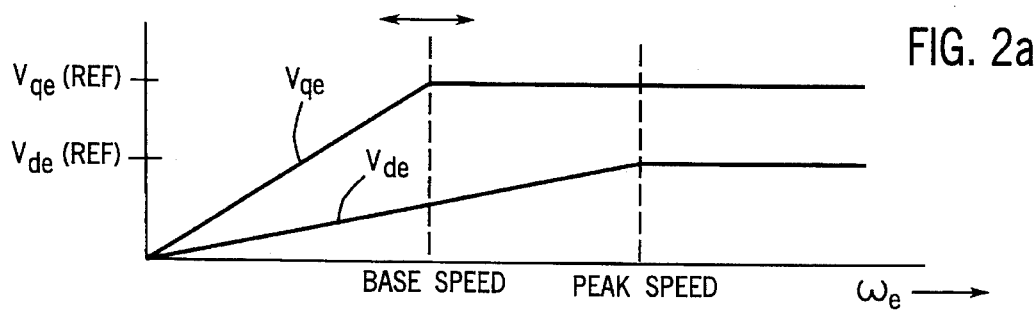
FIG. 2(a) through 2(d) are plots of motor voltage, current, torque, horsepower, slip constant ($K_{slip}$) and slip frequency ($\omega_s$) against rotation rate of the stator flux $\omega_e$ (approximately rotor speed) for a motor operated under the present control strategy, the plots show the adjustment of direct and quadrature voltages and currents to achieve the desired control strategy.
Figure 2B:
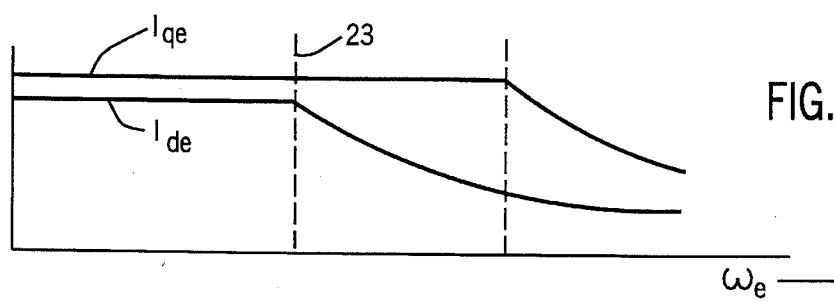
Figure 2C:
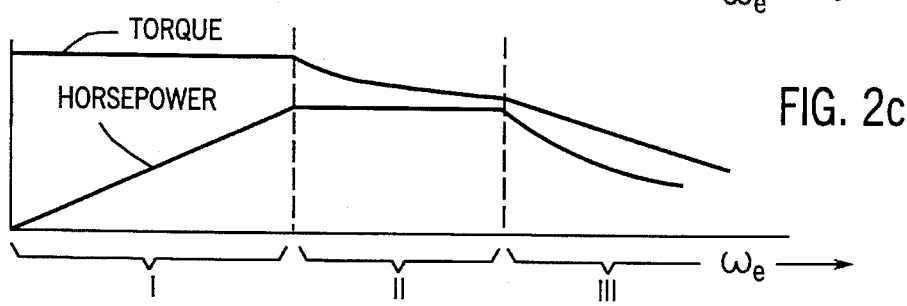
Figure 2D:
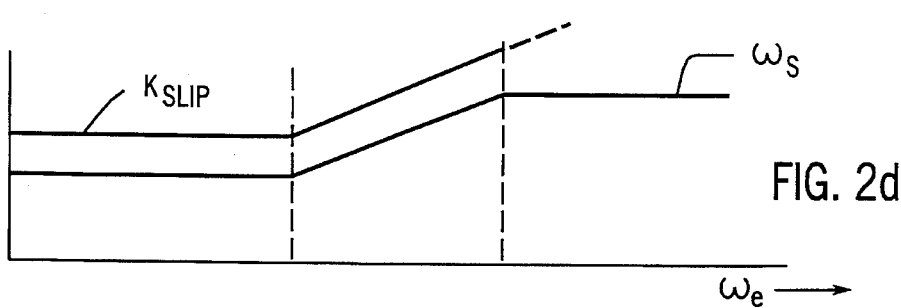

The effect of the reference voltages on the control strategy may best be seen with reference to FIGS. 2(a)–2(c). Referring now to FIG. 2(c) for rates $\omega_e$ below the base frequency 23 indicated by region I, the motor 10 operates in a constant torque mode, the torque being dictated largely by the constant value of the torque and field current commands $I^*_{qe}$, $I^*_{de}$, respectively.

Above the base frequency 23, the motor 10 moves to a constant horsepower region where the flux current command $I^*_{de}$ is decreased as a result of the operation of the flux regulator 26. Specifically, referring to FIG. 5, as the stator frequency $\omega_e$ increases, the value of $V_{qe(ref)}$ according to equation (1) above. For low speeds, $V_{qe(ref)}$ is greater than $V_{qe}$ and $I^*_{de}$ is held constant by the limiter 40 of the flux regulator 26. As the stator frequency $\omega_e$ reaches a predetermined base frequency 23, $V_{qe}$ begins to dominate $V_{qe(ref)}$ and $I^*_{de}$ is decreased as shown in FIG. 2(b) The decrease in $I^*_{de}$ with increase in $\omega_e$ decreases the motor torque but the increase in rotor speed $\omega_r$ produces a constant horsepower as shown in Region II.

The dividing point between Regions I and II is controlled by $V_{qe(ref)}$ and, as will be described, the bus compensator 30 will cause $V_{qe(ref)}$ to be lower for lower values of the supply voltage $V_{bus}$ 19 thus moving the base frequency 23 downward.

Figure 7:
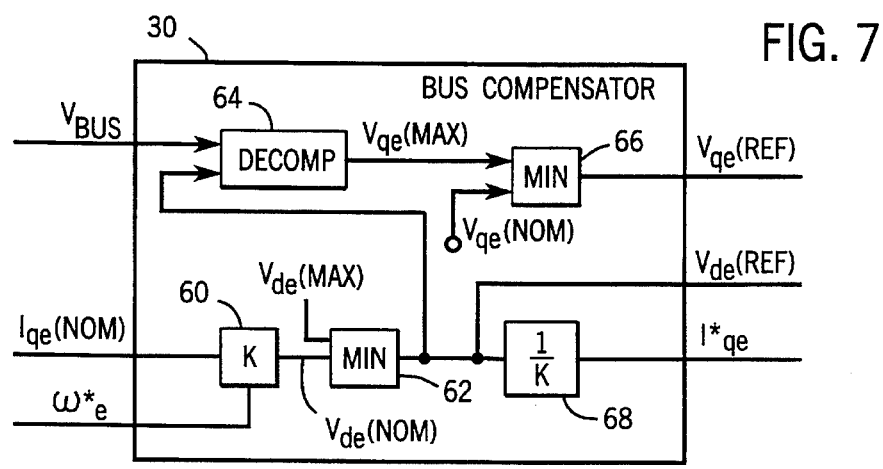
FIG. 7 is a detailed block diagram of the bus compensation circuit of FIG. 4.

Referring now to FIG. 7, the bus compensator 30 generates the above mentioned reference voltages $V_{qe(ref)}$ and $V_{de(ref)}$ used in the flux regulator 26 and slip regulator 28 to control the motor 10 in situations where there is a change in the voltage of the $V_{bus}$ 19. Generally, the bus compensator 30 first determines a desired direct voltage $V_{de(max)}$. $V_{de(max)}$ is developed from the torque producing current $I^*_{qe}$ and the stator frequency $\omega^*_e$ as will be discussed further below. This value $V_{de(max)}$ is compared to the magnitude of the voltage on the bus $V_{bus}$ 19 and the excess voltage of $V_{bus}$ 19 is allocated for the quadrature voltage $V_{qe(ref)}$ so that $$\sqrt{(V_{de(max)})^2 + (V_{qe(max)})^2} < K_{utilization} |V_{bus}|.$$

where $K_{utilization}$ is a factor representing the voltage utilization of the inverter 20.

Thus, any decrease in $V_{bus}$ 19 decreases $V_{qe(max)}$, and as will be seen, $V_{qe(ref)}$, and hence decreases the flux current command $I^*_{de}$ per the flux regulator of FIG. 5.

Specifically, referring also to FIG. 4, the process of establishing the references $V_{de(ref)}$ and $V_{qe(ref)}$ requires first comparing the desired speed of the rotor $\omega^*_r$ with the actual rotor speed $\omega_r$ at summing junction 56. Their difference $\Delta\omega$ is received by a proportional integral regulator 58 to provide a value $I_{qe}(nom)$ representing the required torque current needed to correct the motor speed.

Referring to FIG. 7, the torque current $I_{qe}(nom)$, together with the calculated desired stator frequency $\omega^*_e$ are combined at function block 60 to produce a value $V_{de}(nom)$ per equation (2) and representing the needed direct voltage to produce that torque current. At block 62, the minimum of $V_{de}(nom)$ and a user determined maximum direct voltage $V_{de(max)}$ (representing torque limit distinguishing stages II and III of FIG. 2(c)), is taken to produce a value of $V_{de(ref)}$ as described above with respect to the slip regulator. This value of $V_{de(ref)}$ is also provided to a decomposition block 64 which produces a value of a quadrature voltage $V_{qe(max)}$ such that the sum of the squares of $V_{de(max)}$ and $V_{qe(max)}$ do not exceed the available of $V_{bus}$ as has been described. $V_{qe(max)}$ is provided to block 66 which takes the minimum of $V_{qe(max)}$ and a predetermined user selected value $V_{qe(max)}$ and provides that minimum as $V_{qe(ref)}$. The value of $V_{qe}(nom)$ is selected to insure a certain proportion of total current is allocated to field current regardless of the demands of torque current. The value $V_{de(max)}$ is selected to provide a torque limit to the operation of the motor.

The value $V_{de(ref)}$ is also received by a transformation block 68 to deduce a value $I^*_{qe}$ via equation (2). It is noted that when the value $V_{de(ref)}$ is limited, as will occur when the value of $V_{de}(nom)$ rises above the value of $V_{de(max)}$ the command torque current command $I^*_{qe}$ will decrease with increasing rotor velocity or stator field velocity as shown in FIG. 2(b).

Summarizing and referring again to FIGS. 2(a) through (c), during normal operation of the motor, a constant torque will be provided for a range of speeds up to the base frequency 23. This constant torque is produced by providing constant torque and field currents $I_{qe}$, $I_{de}$. The base frequency is affected by the available voltage $V_{bus}$ 19. As that voltage $V_{bus}$ 19 decreases, the base frequency 23 also decreases. Thus, for an operating speed slightly below the base frequency at full voltage of $V_{bus}$ 19, if $V_{bus}$ 19 drops slightly, the motor 10 may move from a constant torque control to a constant horsepower mode (stages I to II). As he voltage $V_{bus}$ 19 drops, if the speed of the motor 10 is increased beyond a peak speed, first the field current is reduced, then the torque current is also reduced with the resulting net loss in horsepower—assuming no change in the commanded rotor speed $\omega^*_r$. More generally $I^*_{qe}$ may be increased by a velocity controller or torque controller as the supply voltage drops. Thus, the motor controller 11 of the present invention may adapt gracefully to changes in its supply voltage $V_{bus}$ 19 with the net effect being that the motor controller 11 may control the motor more closely to the nominal operating point of the $V_{bus}$ 19 without risk of instabilities or controller shutdown.

In order to apprise the public of the various embodiments that may fall within the scope of the invention, the following claims are made.

I claim:

1. A motor controller for AC electric motors having stator windings, the controller comprising:

a DC source providing a supply voltage;

a controller/inverter receiving the supply voltage and producing at least two AC motor voltages applied to the stator windings, the AC voltages having a controlled frequency and phase to produce a direct voltage $V_d$ and a quadrature voltage $V_q$ across the stator windings and a direct current $I_d$ and a quadrature current $I_q$ in the motor;

a supply voltage compensator receiving a desired value of the direct voltage $V_{d(ref)}$ and the value of the supply voltage to produce a quadrature voltage reference value $V_{q(ref)}$ obtainable with the given values of the supply voltage and the desired direct voltage $V_{d(ref)}$; and a flux regulator connected to the controller/inverter for adjusting the AC waveforms to control the quadrature voltage $V_q$ to not exceed the quadrature voltage reference value $V_{q(ref)}$.

2. The motor controller of claim 1 wherein the flux regulator adjusts the AC waveforms so as to decrease the direct current $I_d$ in response to a drop in the supply voltage.

3. The motor controller of claim 1 including:

a rotor speed sensor connected to the rotor shaft for providing a rotor speed signal;

means for producing a required value for torque current $I_{qe}(nom)$ based upon said rotor speed signal and a desired rotor speed input value; and a direct voltage calculator producing the desired value of the direct voltage $V_{d(ref)}$ as a function of said required value for torque current $I_{qe}(nom)$ and the controlled frequency.

4. The motor controller of claim 1 including:

a direct voltage calculator producing the desired value of the direct voltage $V_{d(ref)}$ as a function of the lesser value of a predetermined maximum direct voltage ($V_{de(max)}$)

and nominal direct voltage ($V_{de(nom)}$) the latter being a function of a desired rotor speed input value.

5. The motor controller of claim 4 including:

a rotor speed sensor connected to the rotor shaft for providing a rotor speed signal; and means for producing a required value for torque current $I_{qe}$(nom) based upon said rotor speed signal and said desired rotor speed input value:

wherein the desired value of the direct voltage $V_{d(ref)}$ is a function of said required value for torque current $I_{qe}$(nom) and the controlled frequency.

6. A motor controller for AC electric motors having stator windings and a rotor, the controller comprising:

a rotor speed sensor connected to the rotor shaft for providing a rotor speed signal;

a DC source providing a supply voltage;

a controller/inverter receiving the supply voltage and producing at least two AC motor voltages applied to the stator windings, the AC voltages having a controlled frequency and phase to produce a direct voltage $V_d$ and a quadrature voltage $V_q$ across the stator windings and a direct current $I_d$ and a quadrature current $I_q$ in the motor;

means for producing a required value for torque current $I_{qe}$(nom) based upon said rotor speed signal and said desired rotor speed input value; and a direct voltage calculator producing a desired value of the direct voltage $V_{d(ref)}$ as a function of said required value for torque current $I_{qe}$(nom) and the controlled frequency, the direct voltage calculator further including means for limiting the desired value of the direct voltage $V_{d(ref)}$ at or below a direct voltage limit $V_{d(max)}$;

a supply voltage compensator receiving said desired value of the direct voltage $V_{d(ref)}$ and a value representing the magnitude of the supply voltage to produce a quadrature voltage reference value $V_{q(ref)}$ obtainable with the given values of the supply voltage and the desired direct voltage $V_{d(ref)}$; and a flux regulator for decreasing the direct current $I_d$ in response to a decrease in the obtainable quadrature voltage $V_{q(ref)}$.

* * * * *